US012721435B2

(12) United States Patent
Short

(10) Patent No.: US 12,721,435 B2
(45) Date of Patent: Sep. 1, 2026

(54) ROCKING-TRANSITIONED MULTIMODAL CONTAINERS

(71) Applicant: Robert Allen Short, Massillon, OH (US)

(72) Inventor: Robert Allen Short, Massillon, OH (US)

(73) Assignee: Robert Allen Short, Massillon, OH (US)

( * ) Notice: Subject to any disclaimer, the term of this patent is extended or adjusted under 35 U.S.C. 154(b) by 10 days.

(21) Appl. No.: 18/428,661

(22) Filed: Jan. 31, 2024

(65) Prior Publication Data

US 2024/0324772 A1 Oct. 3, 2024

Related U.S. Application Data

(63) Continuation-in-part of application No. 17/651,527, filed on Feb. 17, 2022, now Pat. No. 11,950,696.

(60) Provisional application No. 63/583,040, filed on Sep. 15, 2023, provisional application No. 63/150,134, filed on Feb. 17, 2021.

(51) Int. Cl.
*A47B 88/919* (2017.01)
*A47B 88/417* (2017.01)
*B25H 3/02* (2006.01)

(52) U.S. Cl.
CPC .......... *A47B 88/919* (2017.01); *A47B 88/417* (2017.01); *B25H 3/028* (2013.01)

(58) Field of Classification Search
CPC ..... A47B 88/417; A47B 88/919; A47B 67/04; A47B 2210/0059; A47B 2210/08; B25H 3/02; B25H 3/028
USPC .......................................................... 312/350
See application file for complete search history.

(56) References Cited

U.S. PATENT DOCUMENTS

| | | | | |
|---|---|---|---|---|
| 4,314,734 A * | 2/1982 | Grunert | A47B 88/48 | 312/333 |
| 5,399,006 A * | 3/1995 | Murazumi | A61B 50/10 | 312/109 |
| 6,401,727 B1 * | 6/2002 | Carroll | A47B 67/04 | 132/286 |
| 7,963,408 B2 * | 6/2011 | Glover | A47B 88/57 | 312/334.7 |
| 2016/0037918 A1 * | 2/2016 | Greer | A47B 31/00 | 312/283 |

(Continued)

*Primary Examiner* — James O Hansen
(74) *Attorney, Agent, or Firm* — Definitive Patents, member Synchrony IP; Timothy D. Snowden

(57) ABSTRACT

Apparatus and associated methods relate to a storage system having a drawer supported, when extended from a housing, by a lid. In an illustrative example, the drawer may have a first engagement feature. The lid may, for example, have a second engagement feature. The housing may, for example, have a first slide configured to slidingly receive the drawer. The housing may, for example, have a second slide configured to slidingly receive the lid. In a support mode, for example, the lid may be disposed in the second slide beneath the drawer such that, when the drawer is slid out of the housing beyond a first distance, then the engagement features interact to extend the lid from the housing such that the lid supports at least a portion of a weight of the drawer. Various embodiments may advantageously provide a cost-effective, transportable, and/or modular storage system.

24 Claims, 12 Drawing Sheets

(56) References Cited

U.S. PATENT DOCUMENTS

| | | | | |
|---|---|---|---|---|
| 2017/0066566 | A1* | 3/2017 | Nilsson | A47B 88/483 |
| 2018/0049562 | A1* | 2/2018 | Rosner | A47F 5/0025 |

* cited by examiner

ROCKING-TRANSITIONED MULTIMODAL CONTAINERS

CROSS-REFERENCE TO RELATED APPLICATIONS

This application is a continuation-in-part of U.S. application Ser. No. 17/651,527, titled "MODULAR STORAGE COMPARTMENTS WITH TRI-MODE LIDS," filed by Robert Allen Short on Feb. 17, 2022, which claims the benefit of U.S. Provisional Application Ser. No. 63/150,134, titled "MODULAR STORAGE COMPARTMENTS WITH TRI-MODE LIDS," filed by Robert Allen Short on Feb. 17, 2021.

This application claims the benefit of U.S. Provisional Application Ser. No. 63/583,040, titled "MULTIMODAL POLYANGULAR CONFIGURED TRACK SYSTEM," filed by Robert Allen Short on Sep. 15, 2023.

This application incorporates the entire contents of the foregoing applications herein by reference.

TECHNICAL FIELD

Various embodiments relate generally to storage compartments with lids.

BACKGROUND

Construction professionals may carry and/or store various tools and supplies. For example, a finish carpenter may carry saws, measuring and marking tools, nailers, hardware, and/or finishing supplies. A tiler may, for example, carry tiling cutters, trowels, spacers, and/or sponges. An electrician may, for example, carry wire strippers, fish tape and/or rods, crimpers, electrical boxes and outlets, and/or wire.

Various users may carry and/or store tools or supplies. A remote control hobbyist may store motors, switches, leads, testing equipment, and/or soldering equipment. A family may store hardware, do-it-yourself tools, jewelry, and/or kitchen equipment.

Tools and/or supplies may, for example, be stored in containers. Containers may, for example, provide openings for access. Toolboxes may, for example, provide storage. Toolboxes may have drawers, such as with steel slides. Toolboxes may, for example, have wheels for moving.

SUMMARY

Apparatus and associated methods relate to a storage system having a drawer supported, when extended from a housing, by a lid. In an illustrative example, the drawer may have a first engagement feature. The lid may, for example, have a second engagement feature. The housing may, for example, have a first slide configured to slidingly receive the drawer. The housing may, for example, have a second slide configured to slidingly receive the lid. In a support mode, for example, the lid may be disposed in the second slide beneath the drawer such that, when the drawer is slid out of the housing beyond a first distance, then the engagement features interact to extend the lid from the housing such that the lid supports at least a portion of a weight of the drawer. Various embodiments may advantageously provide a cost-effective, transportable, and/or modular storage system.

Various embodiments may achieve one or more advantages. For example, various embodiments may advantageously enable a lid to serve (e.g., selectively) dual purposes of securing a container's contents and acting as part of the drawer slide. A lid mode may, for example, advantageously be used to protect contents of a drawer (e.g., during transport, prevention of dust/splashes). A support mode may, for example, advantageously support a corresponding drawer when slid forward to extend from a housing.

Various embodiments may advantageously reduce or eliminate problems associated with a full-extension drawer 'jerking' and/or increased difficulty in sliding as a drawer approaches a fully extended position. For example, some embodiments may advantageously reduce friction when sliding. Such embodiments may, for example, allow easy sliding operation of a drawer by a user.

Some embodiments may, for example, advantageously provide a modular storage solution. For example, a user may select different drawer height configurations based on their intended usage. Accordingly, various embodiments may advantageously provide a user a modular container storage and/or transportation system that is capable of efficiently storing, transporting, and/or using contents of a container. Various embodiments may advantageously provide containers (e.g., drawers) that fit interchangeably into a housing and function like drawers while in the housing and as individual cases when not in the housing.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, to help introduce discussion of various embodiments, a lid-supported container system (LSCS) is introduced with reference to FIG. 1. Second, that introduction leads into a description with reference to FIGS. 2A-4 of an exemplary embodiment of the LSCS shown in FIG. 1. Third, with reference to FIGS. 5-9, an exemplary LSCS embodiment is discussed. Fourth, and with reference to FIG. 10, exemplary mechanics of an LSCS is discussed. FIG. 11 discusses an employed multimodal-polyangular configured track system (MPTS), as referred to U.S. provisional application. 63/583,040. Finally, the document discusses further embodiments, exemplary applications and aspects relating to LSCSs.

Figure 1:
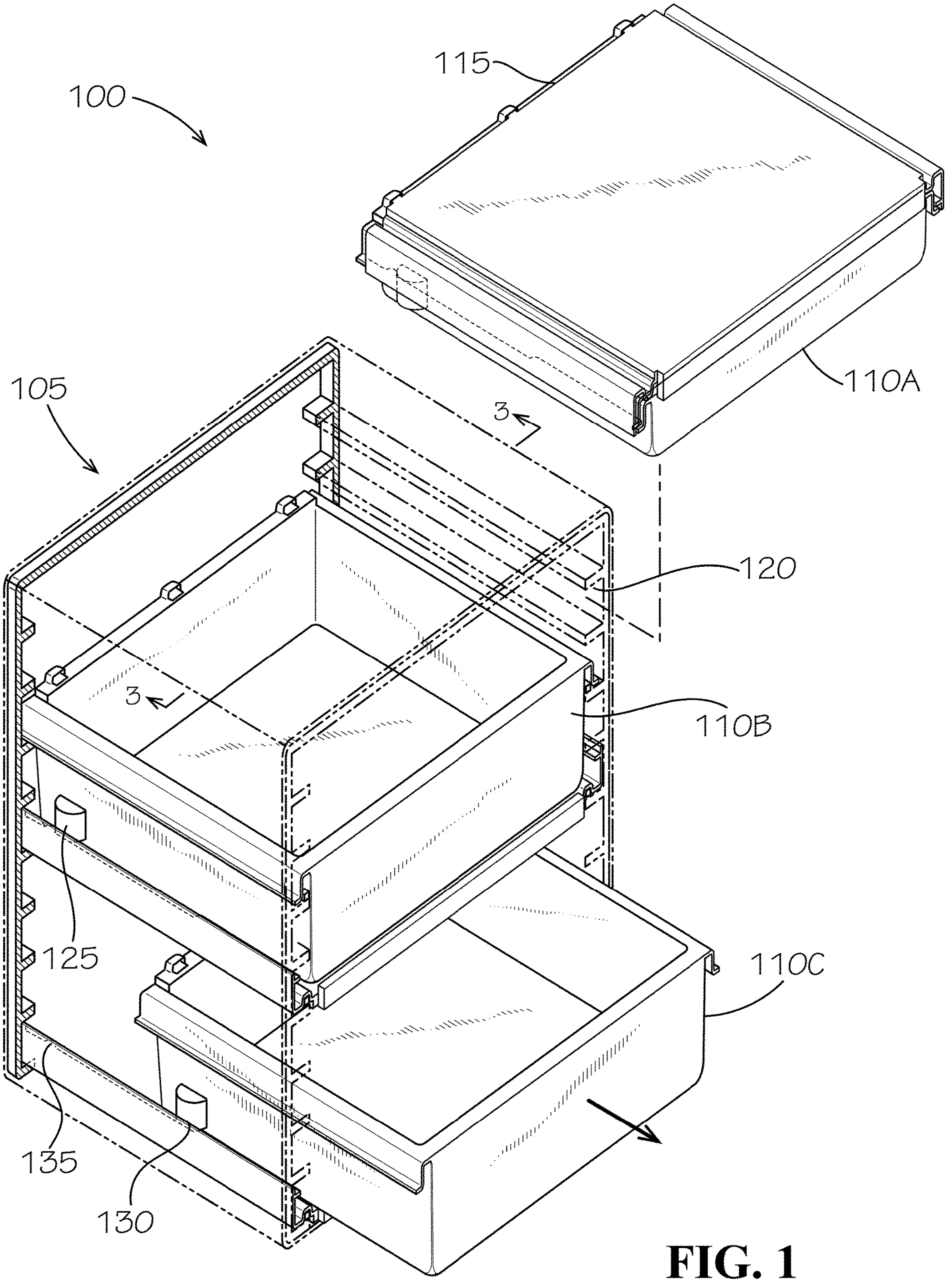
FIG. 1 depicts an exemplary lid-supported container system (LSCS) in an illustrative use-case scenario.

FIG. 1 depicts an exemplary lid-supported container system (LSCS) in an illustrative use-case scenario. In the depicted example, an LSCS 100 includes a housing 105. The housing 105 is configured to receive drawers 110. As depicted, the housing 105 slidingly receives a first drawer 110A, a second drawer 110B, and a third drawer 110C. A multi-mode lid 115 is provided for each of the drawers 110.

The housing 105 is provided with slides 120 (e.g., channels). The slides 120 are configured to support the drawers 110 and/or the multi-mode lid(s) 115, when disposed in the housing. As depicted, for example, the slides 120 may be substantially evenly spaced (e.g., evenly distributed along a height of the housing 105). The second drawer 110B and the third drawer 110C are slidingly disposed in the housing 105 and supported by corresponding slides 120. Corresponding multi-mode lids 115 are disposed, in a 'support mode,' in further corresponding slides 120 beneath the second drawer 110B and the third drawer 110C. The first drawer 110A is covered, in a 'lid mode' with a corresponding multi-mode lid 115.

The drawers 110 are provided with drawer engagement features 125. In the depicted example, each drawer 110 is provided with a drawer engagement feature 125 on a left side and a right side of the drawer body. The multi-mode lid 115 is provided with a proximal engagement feature 130 and a distal engagement feature 135 (proximal and distal, for example, relative to a front of the housing facing a user operating the drawers and/or lids). Together, the proximal engagement feature 130 and the distal engagement feature 135 form an engagement channel.

In the support mode, the drawer engagement feature 125 may be brought into register with and be releasably retained in the engagement channel between the proximal engagement feature 130 and the distal engagement feature 135. When operating the multi-mode lid 115 from a lid mode to a support mode, for example, the multi-mode lid 115 may be inserted into corresponding slides 120 beneath the corresponding drawer 110, and a minimum force (e.g., predetermined minimum force) may be applied to cause the distal engagement feature to move from a position proximal to the drawer engagement feature 125 to a position distal to the drawer engagement feature 125. For example, the (predetermined) minimum force may cause the distal engagement feature 135 and/or the drawer engagement feature 125 to 'flex' away from each other to allow the multi-mode lid 115 to travel into a position (completely) beneath the drawer 110.

Accordingly, a multi-mode lid 115 in a storage mode may be (releasably) coupled to slidably travel in a predetermined path relative to travel of the corresponding drawer 110. For example, as depicted with reference to the third drawer 110C, the third drawer 110C may be slid forward (out of the housing 105). The drawer engagement feature 125 may slide forward in the engagement channel until the drawer engagement feature 125 is brought against the proximal engagement feature 130. Continued forward operation of the third drawer 110C may, for example, urge the multi-mode lid 115 to slide forward because of the engagement of the drawer engagement feature 125 against the proximal engagement feature 130. Accordingly, the multi-mode lid 115 may be slid forward at a (predetermined) distal offset from the third drawer 110C. Once the third drawer 110C is fully extended, for example, the multi-mode lid 115 may be still engaged a (predetermined minimum) distance in the corresponding slides 120 and extend a (predetermined maximum) distance out of the housing 105 under the third drawer 110C. Accordingly, for example, the multi-mode lid 115 may be automatically positioned to support the third drawer 110C in an extended state.

Operation of the third drawer 110C to slide back into the housing may, for example, bring the drawer engagement feature 125 against the distal engagement feature 135. Continued operation of the third drawer 110C back into the housing may, for example, urge the multi-mode lid 115 back into the housing 105 underneath the third drawer 110C. Accordingly, the engagement features may, for example, cooperate to automatically operate the multi-mode lid 115, when in a support mode and in response to operation of a corresponding drawer, between at least an extended position supporting the drawer and a stowage position in the housing 105.

Figure 2B:
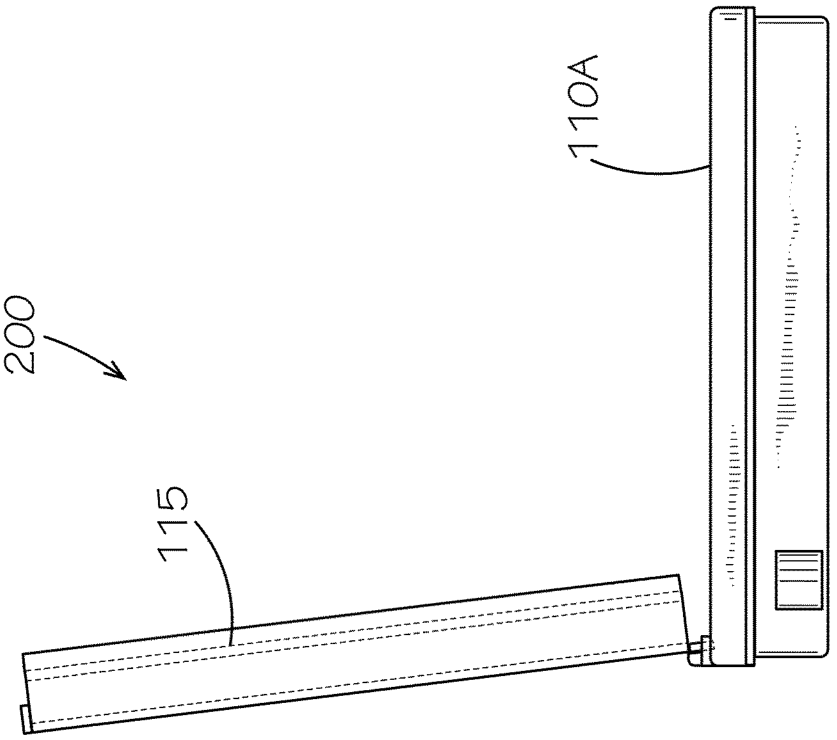
FIG. 2B depicts a side elevation view of the exemplary drawer and lid of FIG. 2A.
Figure 2A:
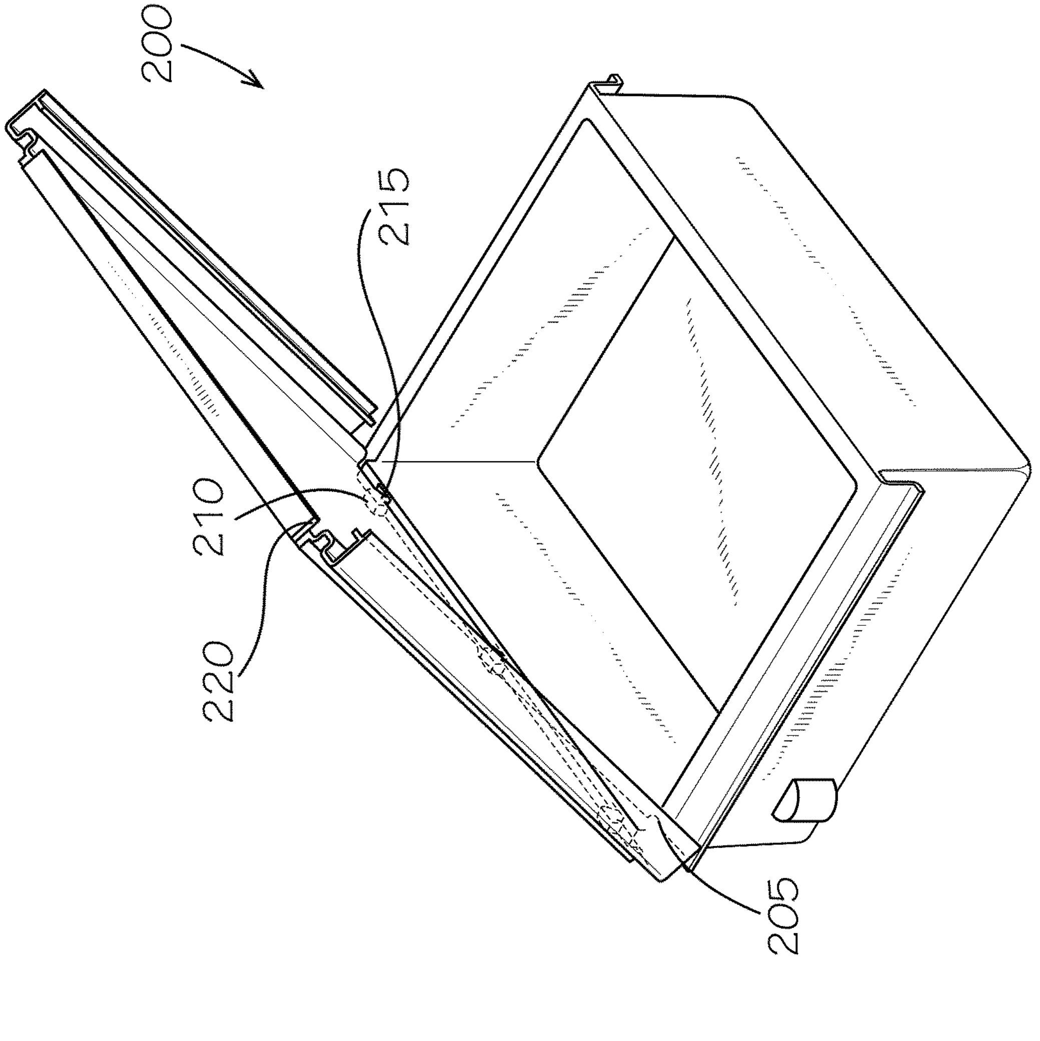
FIG. 2A depicts a perspective view of an exemplary drawer and lid of the exemplary LSCS of FIG. 1.

FIG. 2A depicts a perspective view of an exemplary drawer and lid of the exemplary LSCS of FIG. 1. FIG. 2B depicts a side elevation view of the exemplary drawer and lid of FIG. 2A. A drawer assembly 200 includes the first drawer 110A and a multi-mode lid 115. The multi-mode lid 115 is in the lid mode, engaging the first drawer 110A as a 'lid' such that the lid may be (selectively) operated to cover a cavity defined by the first drawer 110A. The multi-mode lid 115 is depicted in FIG. 2A in a position between a closed position (covering the first drawer 110A) and an open position. The multi-mode lid 115 is depicted in FIG. 2B in an open position.

The first drawer 110A is provided with a recess 205 in an upper rim of the drawer. Accordingly, when a proximal edge of the multi-mode lid 115 is operated upward, the distal engagement feature 135 may pivot downwards into the recess 205. The first drawer 110A is also provided with multiple (e.g., three, as depicted) support features 210. A support feature 210 may include, as depicted, a protruding catch feature and an aperture distal of the protruding catch feature. The multi-mode lid 115 is provided with multiple (e.g., three, as depicted) support members 215. A support member 215 may, when the multi-mode lid is urged distally in the lid mode (e.g., in a closed position), slide into a protruding catch feature of a corresponding support feature 210. When the multi-mode lid 115 is then pivoted upward, the support member 215 may pivot within the aperture of the corresponding support feature 210 and rest against a proximal surface (e.g., edge) of the aperture. Accordingly, the corresponding support feature 210 and the support member 215 may, for example, cooperate to support the multi-mode lid 115 in an open position in a lid mode, such as is shown in FIG. 2B.

The multi-mode lid 115 is provided with a front reinforcement member 220. The front reinforcement member 220, as depicted, is at a front edge of the multi-mode lid 115. The front reinforcement member 220 may, for example, 'catch' the front of the drawers 110 when the multi-mode lid 115 is operated into a lid mode. The front reinforcement member 220 may, for example, provide rigidity to the multi-mode lid 115. The front reinforcement member 220 may, for example, support the drawers 110 in a substantially horizontal orientation when the multi-mode lid 115 is in a support mode and the drawers 110 is extended out of the housing 105 and supported by the multi-mode lid 115, such as, for example, is illustrated, by way of example and not limitation, in FIG. 10.

Figure 3:
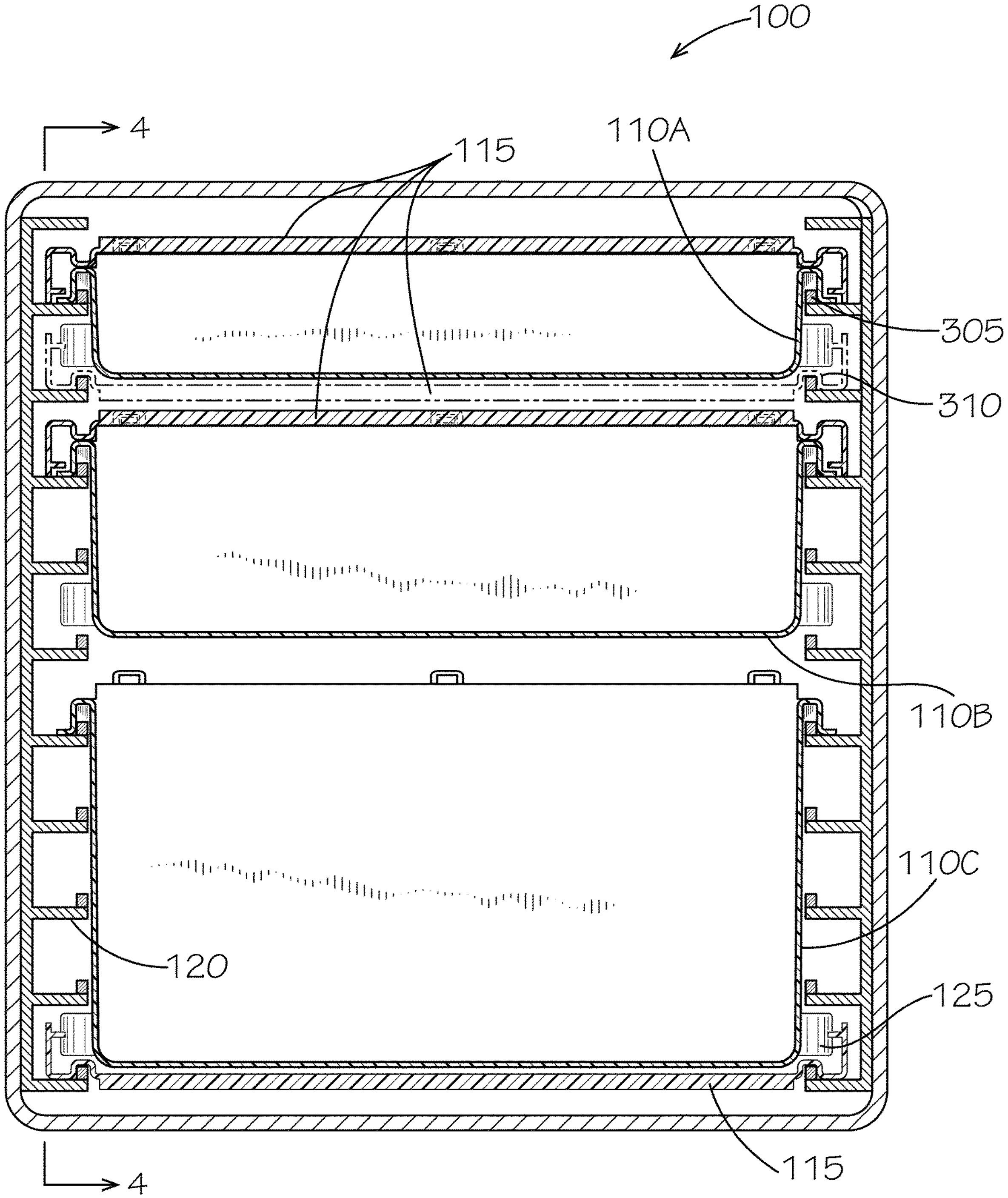
FIG. 3 depicts a cross-section view of the exemplary LSCS of FIG. 1.

FIG. 3 depicts a cross-section view of the exemplary LSCS of FIG. 1. As depicted in this cross-section view of the LSCS 100, the multi-mode lid 115 for the first drawer 110A has been operated from a lid mode in a closed position (shown in dashed lines) to a support mode. The multi-mode lid 115 for the second drawer 110B is in a support mode. The multi-mode lid 115 for the third drawer 110C is in a support mode.

As depicted, the first drawer 110A, the second drawer 110B, and the 110C are different depths. For example, the first drawer 110A may be used, by way of example and not limitation, for hardware, writing utensils, drill bits. For example, the second drawer 110B may be used, by way of example and not limitation, for hand tools (e.g., hammers, saws). The third drawer 110C may be used, by way of example and not limitation, for power tools (e.g., impact driver, drill, rotary saw, oscillating tool, batteries, chargers). The slides 120, in this depicted example, are distributed substantially evenly along a height of the housing 105. The drawers 110 are configured such that the lid may be supported in one pair of slides 120 and the corresponding lid be disposed beneath the drawer in a second pair of slides 120. Depending on height of the drawer 110, the first pair of slides and the second pair of slides may, for example, be adjacent, or be separated by one or more (currently unused) slides. Accordingly, various embodiments may advantageously provide a modular storage solution. For example, a user may select different drawer height configurations based on their intended usage.

As depicted, the slides 120 are provided with stops 305. Rib(s) (e.g., shown in FIG. 4) on the drawers 110 engage the stops 305 at predetermined positions. The multi-mode lid 115 is provided with a channel 310. The channel 310 may, as depicted, register with the stops 305 (e.g., side-to-side) such that the lid is not spaced away from the slides 120 by the stops 305 when the multi-mode lid 115 is operated into a support mode.

The channel 310 may, for example, allow flexing of the left and/or right flanges of the multi-mode lid 115. For example, when the distal engagement feature 135 is operated past the drawer engagement feature 125 when the multi-mode lid 115 is in the support mode, the channel 310 may, for example, advantageously allow the flange containing the distal engagement feature 135 to flex outwards away from the corresponding drawer 110.

In some embodiments, such as depicted, the multi-mode lid 115, the drawers 110, and the housing 105 are configured to provide clearance for operation of the multi-mode lid 115 and/or the drawers 110. As an illustrative example given by way of example and not limitation, a distance between two slides 120 may be about 1.125 inches. A clearance between the upper surface of the flange of the multi-mode lid 115 (in the lid mode) and the slide 120 above it may be about 0.375 inch. The stops 305 may be about 0.25 inch tall. The clearance between the upper slide 120 and the top surface of the flange of the multi-mode lid 115 may be, for example, about 0.125 inch when the drawers 110 is lifted up to clear the stops 305. Such embodiments may, for example, advantageously provide clearance to allow a user to easily operate the drawer without 'binding' the drawer against the slides.

Figure 4:
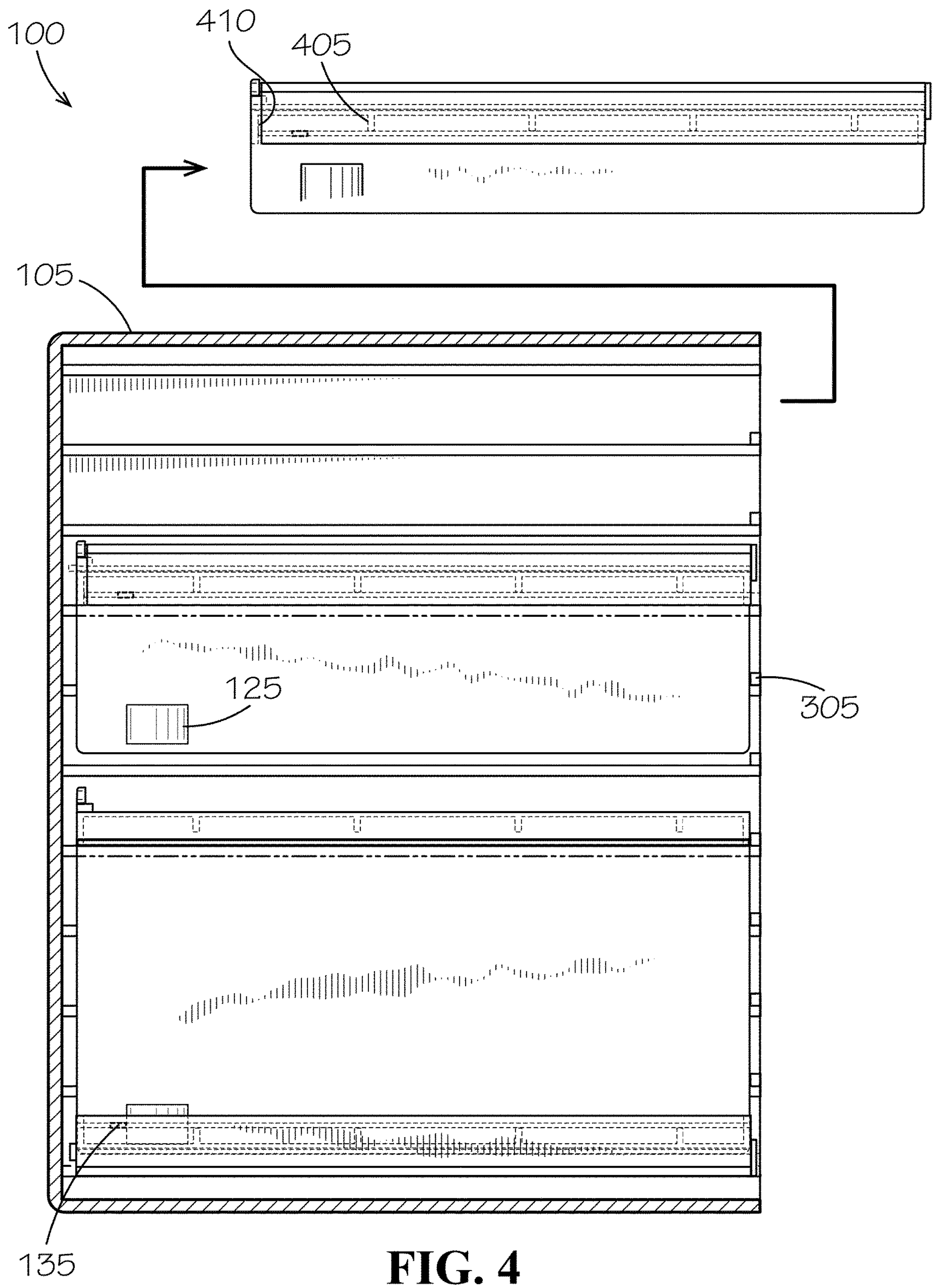
FIG. 4 depicts a cross-section view of the exemplary LSCS of FIG. 3.

FIG. 4 depicts a cross-section view of the exemplary LSCS of FIG. 3. Multiple ribs are shown on the first drawer 110A. The ribs may, for example, support a flange of the drawers 110 (e.g., stabilize). In the depicted example, a catch rib 410 is a first length and a support rib 405 is a second length. As depicted, the first length is greater than the second length. The catch rib 410 may be configured to engage the stops 305. The support rib 405 may, for example, be configured to avoid engaging the stops 305. In the depicted example, the front and rear ribs are a catch rib 410. Accordingly, for example, the catch rib 410 may engage the stops 305 to releasably retain the drawers 110 in a closed position (e.g., by the front rib, on the right side of the drawers shown in FIG. 4). For example, the catch rib 410 may engage the stops 305 to releasably retain the drawers 110 in an opened position (e.g., to prevent a drawer from falling out of the housing 105), such as by the rear rib (on the left side of the drawers shown in FIG. 4). The support rib 405 and the catch rib 410 are not shown in FIGS. 1-3 for visual clarity.

As depicted in this cross-section view of the LSCS 100, the drawer assembly 200 has been removed entirely from the housing 105 (e.g., to be transported and/or accessed individually).

The second drawer 110B is depicted as being operated forward (e.g., to access contents). The drawer engagement feature is just distal to a corresponding proximal engagement feature 130 of the corresponding multi-mode lid 115. Accordingly, continued operation of the second drawer 110B may slide the multi-mode lid 115 forward to support the second drawer 110B.

The third drawer 110C is depicted as in a stowage position. The drawer engagement feature 125 is depicted as being just proximal to the distal engagement feature 135 of the corresponding multi-mode lid 115. For example, the third drawer 110C may have been slid rearward and pushed the multi-mode lid 115 back into a stowage position within the housing 105 by interaction between the distal engagement feature 135 and the drawer engagement feature 125.

In some embodiments, a multi-mode lid 115 may be operated from a support mode to a lid mode while the corresponding drawer 110 remains in the housing. For example, the multi-mode lid 115 may be removed from slides 120 beneath the drawer 110 (e.g., by 'snapping' the distal engagement feature 135 past the drawer engagement feature 125). The multi-mode lid 115 may, for example, be operated into a lid mode. For example, the multi-mode lid 115 may be flipped over (e.g., such as substantially 180-degree flip side-to-side) and then slid into the housing 105 over the drawer 110. In some embodiments, the multi-mode lid 115 may slide into a same set of slides 120 as support the drawer 110. A lid mode in the housing 105 may, for example, advantageously be used to protect contents of the drawer 110 (e.g., during transport, prevention of dust/splashes). For example, the multi-mode lid 115 may be operated into lid mode when a drawer/lid assembly is in the housing 105 but a user is not intending to extend the 110.

In some embodiments, the distal engagement feature 135 and/or the proximal engagement feature 130 may flex (e.g., outwards away from the drawer 110) when operated past the drawer engagement feature 125. In some embodiments, the drawer engagement feature 125 may flex. For example, in some embodiments, an engagement feature may include a spring-loaded plunger. In some embodiments, by way of example and not limitation, an engagement feature may include a 'living spring' (e.g., a piece of material, such as plastic, configured to flex and/or deform in response to application of a (predetermined) minimum force).

Figure 5:
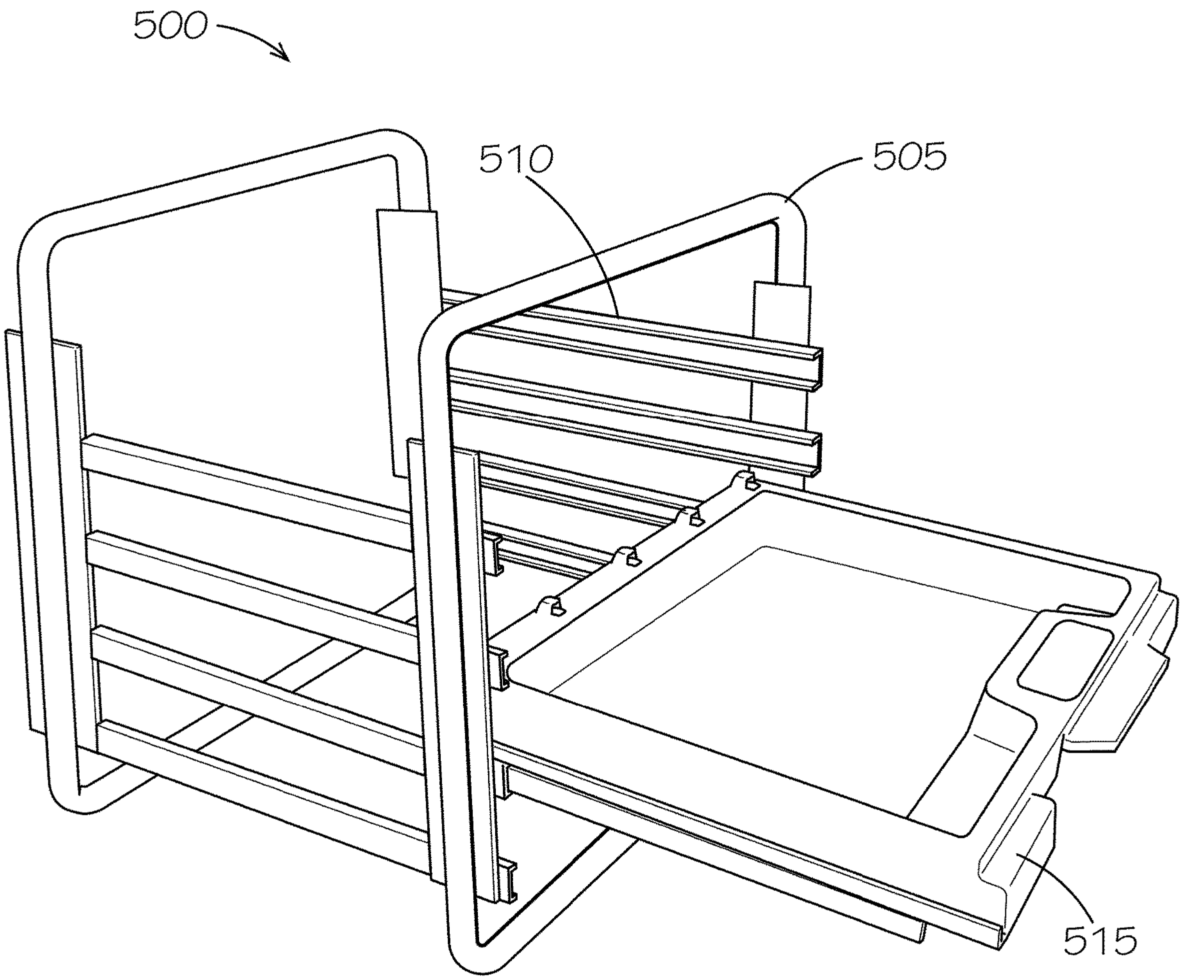
FIG. 5 depicts a perspective view of an exemplary LSCS.
Figure 6:
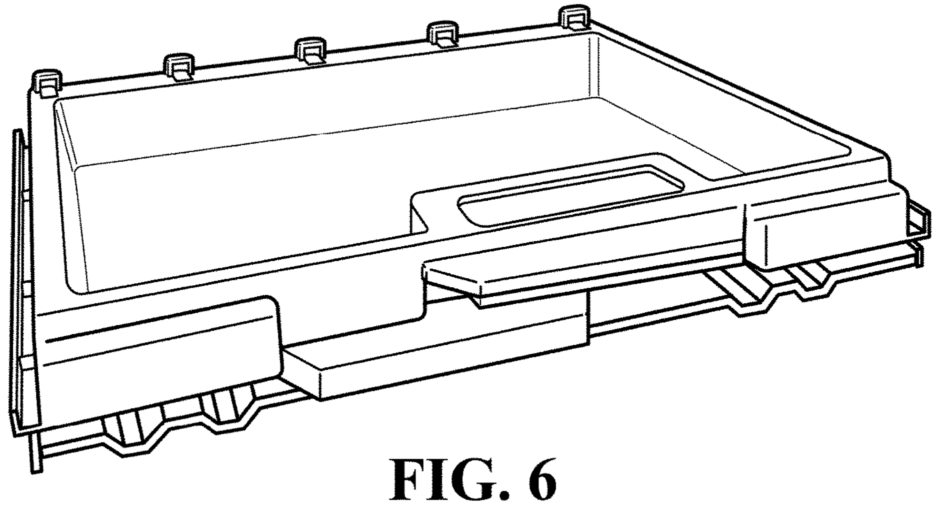
FIG. 6 depicts an isolated perspective view of an exemplary drawer and exemplary lid (in support mode) of the exemplary LSCS of FIG. 5.
Figure 7:
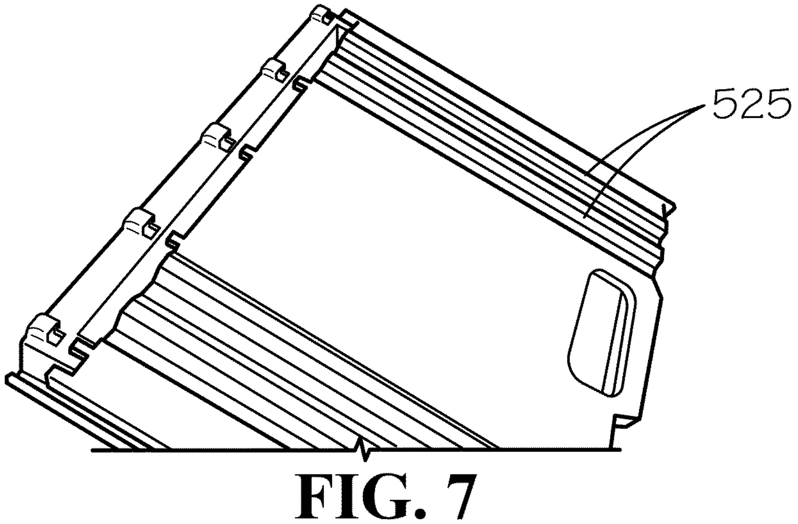
FIG. 7 depicts a perspective view of the exemplary lid and drawer of FIG. 6, with the lid being operated into a closed position in an exemplary lid mode.
Figure 8:
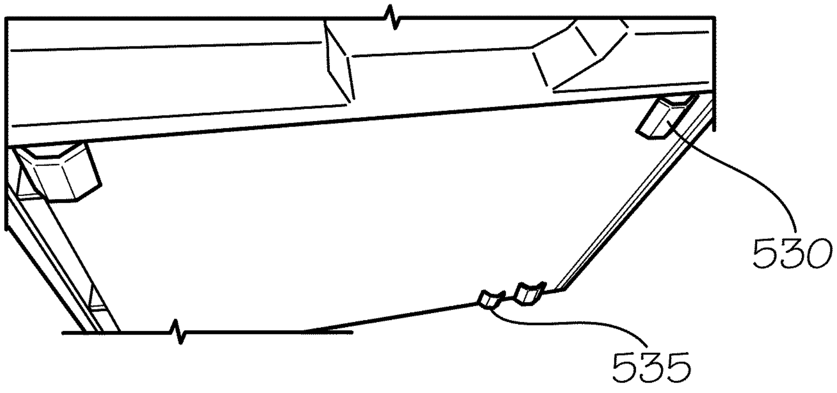
FIG. 8 depicts a perspective view of an underside of the exemplary drawer of FIG. 6.
Figure 9:
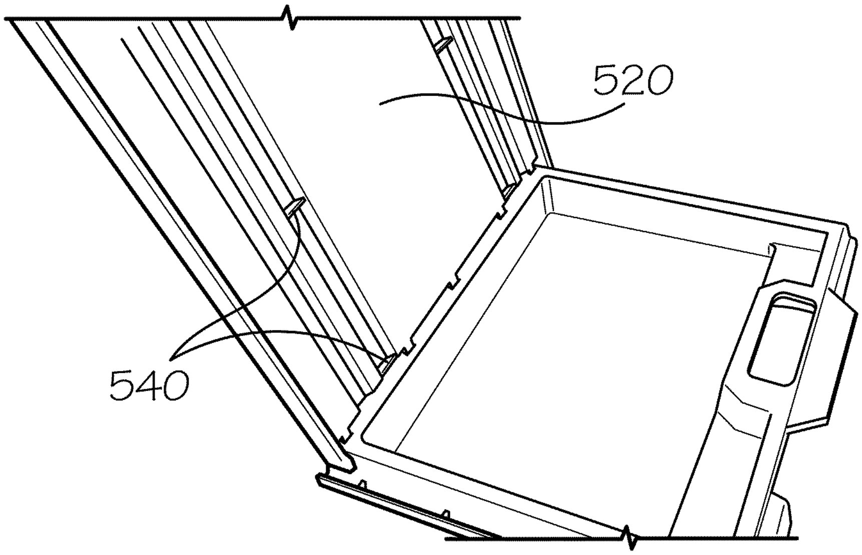
FIG. 9 depicts the exemplary lid and drawer of FIG. 6, with the lid operated into an open position of an exemplary lid mode.

FIG. 5 depicts a perspective view of an exemplary LSCS. FIG. 6 depicts an isolated perspective view of an exemplary drawer and exemplary lid (in support mode) of the exemplary LSCS of FIG. 5. FIG. 7 depicts a perspective view of the exemplary lid and drawer of FIG. 6, with the lid being operated into a closed position in an exemplary lid mode. FIG. 8 depicts a perspective view of an underside of the exemplary drawer of FIG. 6. FIG. 9 depicts the exemplary lid and drawer of FIG. 6, with the lid operated into an open position of an exemplary lid mode.

In the depicted example, an LSCS 500 includes a housing 505. The housing 505 is provided with slides 510. A drawer 515 may be operated into the slides 510. A lid 520 may be operated, for example, between a lid mode and a support mode. The lid 520, as depicted, is provided with channels 525 (e.g., 'corrugation channels'). The channels 525 may, for example, increase bending strength (e.g., along a front to back axis of the lid) of the lid 520. The drawer 515 is provided with feet 530. When the lid 520 is operated into a support mode (e.g., beneath the drawer 515), the feet 530 nest inside the channels 525.

The drawer 515 is provided with an engagement feature 535 (e.g., at a distal edge, as depicted). The lid 520 is provided with engagement features 540 defining an engagement channel. In a support mode, the engagement feature 535 may be releasably 'trapped' between the engagement features 540 such that the lid 520 is positioned beneath the drawer 515 in response to operation of the drawer 515.

Figure 10:
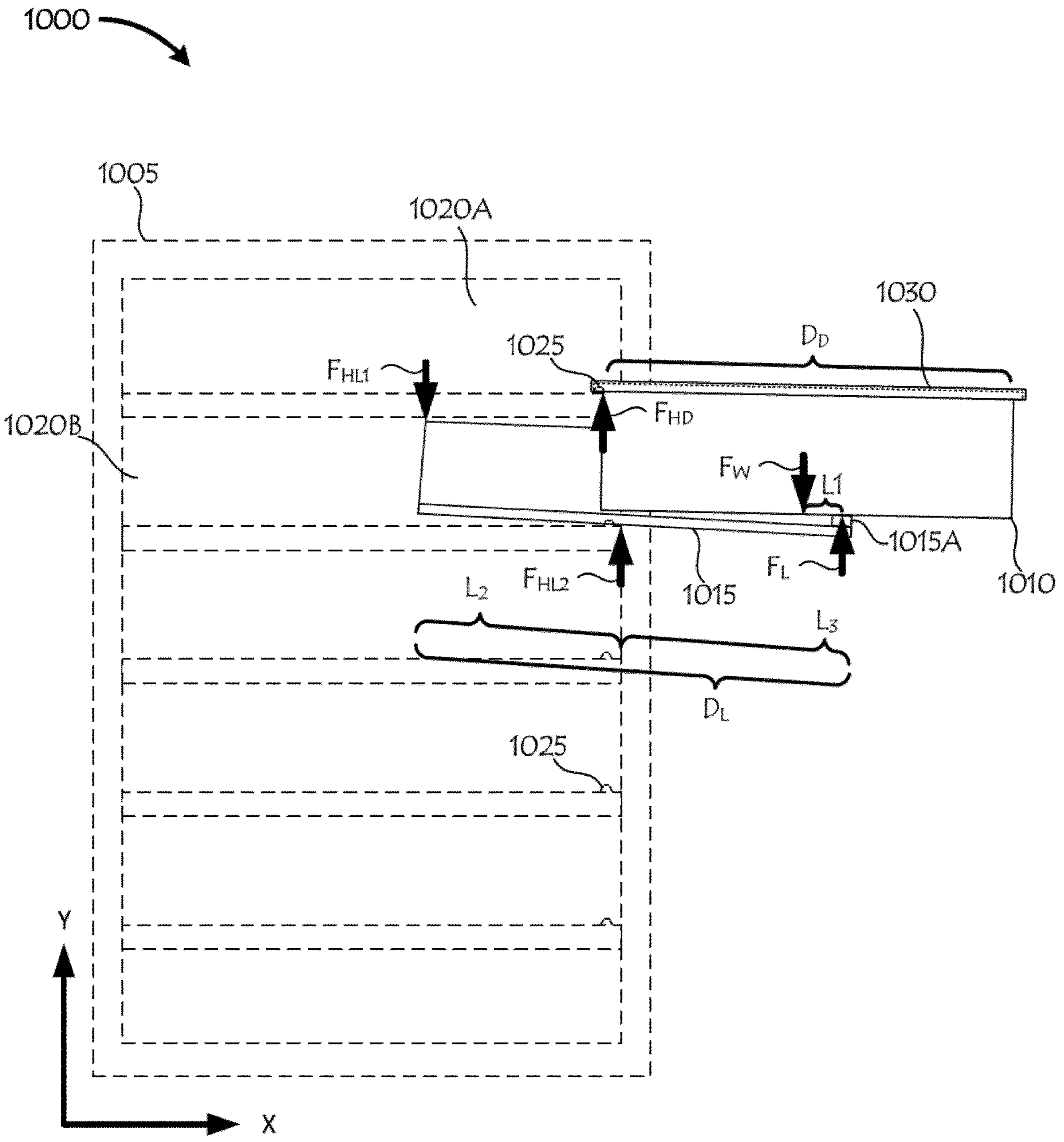
FIG. 10 depicts an exemplary simplified force diagram of an exemplary LSCS in an illustrative use-case scenario.
Figure 11:
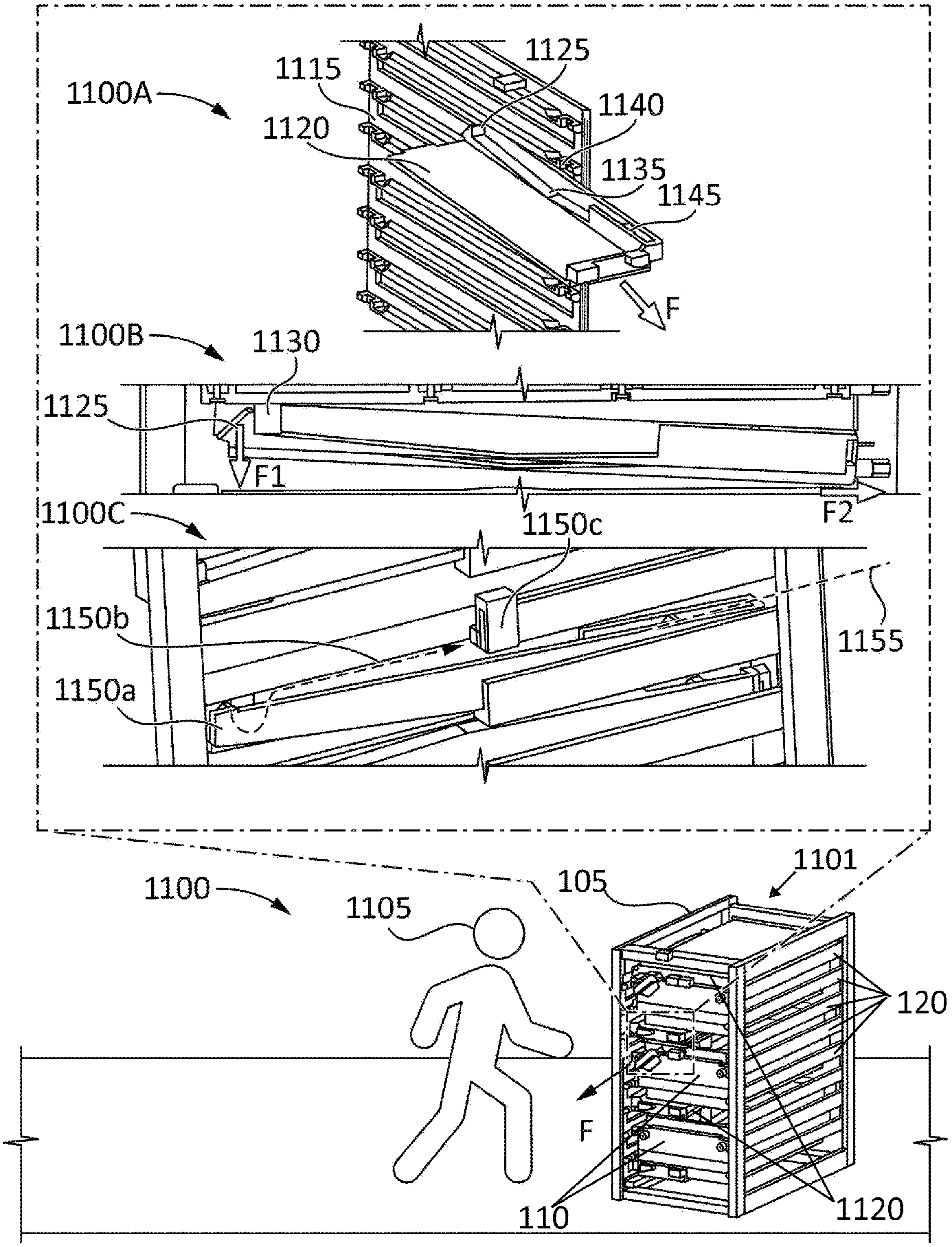
FIG. 11 depicts an employed Multimodal-Polyangular-Configured Track System (MPTS) in an illustrative use-case scenario.
Figure 12:
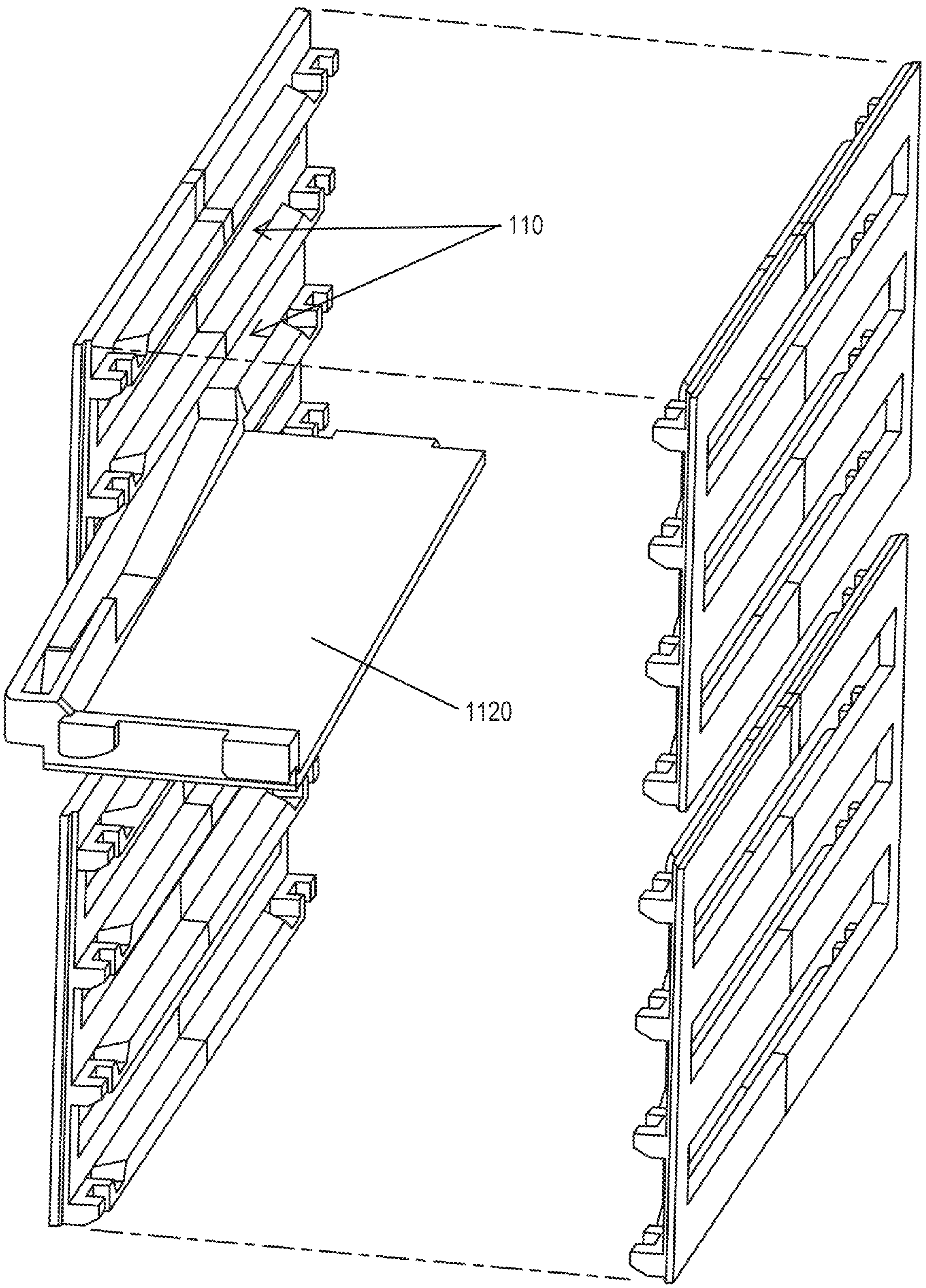
FIG. 12, FIG. 13, FIG. 14, and FIG. 15 depict close-up views of the example MPTS embodiment depicted in FIG. 11.
Figure 13:
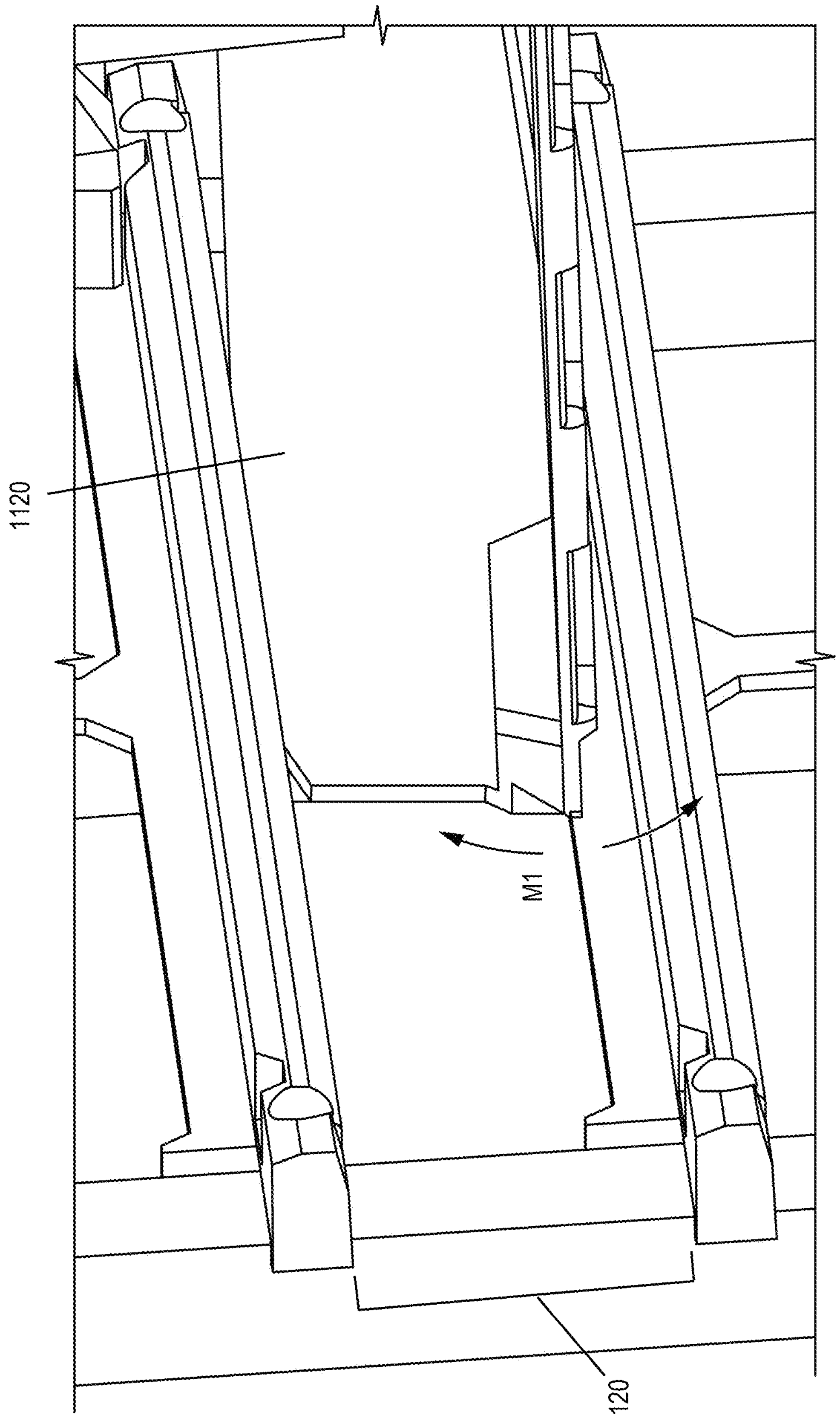

FIG. 10 depicts an exemplary simplified force diagram of an exemplary LSCS in an illustrative use-case scenario. An LSCS 1000 includes a housing 1005. A drawer 1010 is extended outwards from the housing 1005. A lid 1015 is in a support mode. The drawer 1010 is supported partially in a first slide 1020A. The lid 1015 is supported in a second slide 1020B.

The drawer 1010 has a weight $F_W$. The first slide 1020A of the housing 1005 exerts a resistive force $F_{HD}$ on the drawer at a point of contact. As depicted, in an extended position when the lid is in the support mode, the second slide 1020B of the housing 1005 exerts a first resistive force $F_{HL1}$ and a second resistive force $F_{HL2}$ on the lid 1015. The lid 1015 exerts a resistive force $F_L$ on the drawer 1010.

The drawer 1010 has a depth $D_D$. The lid has a depth $D_L$. $D_D$ may, for example, substantially equal $D_L$. $F_L$ is offset by a length L1 from the $F_W$. In the depicted example, the $F_L$ is applied distal to a center of gravity of the drawer 1010 (e.g., at least when empty and/or content mass is substantially evenly distributed front to back). The center of gravity is depicted by the placement of the $F_W$.

Summing the forces on the drawer 1010 in the Y direction gives Equation 1:

$$\sum F_y = F_{HD} + F_L + (-F_W),$$

where "–" indicates a downward force.

Summing the forces on the lid 1015 in the Y direction gives Equation 2:

$$\sum F_y = F_{HL2} + (-F_{HL1}) + (-F_L).$$

Summing the moment about a pivot point of the lid 1015 (e.g., represented by a position of the $F_{HL2}$) gives Equation 3:

$$\sum M = F_{HL1} \cdot L_2 + (-F_L) \cdot L_3$$

In a static loading situation (e.g., where the drawer 1010 is at rest and supported by the housing 1005 and the lid 1015), then Equation 1, Equation 2, and Equation 3 all equal zero.

Engagement features (not shown) of the drawer 1010 and/or the lid 1015 may, for example, be configured such that $L_3 < L_2$, and/or such that $L_1 > 0$. Accordingly, the lid 1015 may 'balance' the drawer 1010 in cooperation with the first slide 1020A. Such embodiments may allow the drawer 1010 to travel freely within the first slide 1020A. Accordingly, various embodiments may advantageously reduce friction between the drawer 1010 and the first slide 1020A (e.g., by reducing a portion of the $F_W$ supported by the first slide 1020A, by reducing a surface area of contact between the first slide 1020A and the drawer 1010). Such embodiments may, for example, allow a user to support a proximal end of the drawer (e.g., by 'lifting up') during sliding such that reduced weight is applied to the first slide 1020A and/or the lid 1015. Accordingly, friction may be advantageously reduced allowing, for example, easy sliding operation of the drawer 1010 by the user.

In the depicted example, the lid 1015 is provided with a leveling feature 1015A. For example, the leveling feature 1015A may include a 'beam' running side-to-side across the lid 1015 (e.g., along at least a portion of a width of the lid. The beam may, for example, advantageously support the drawer 1010 in a substantially horizontal orientation even though the lid is 'tipping downward.'

In the depicted example, the slides 1020 are provided with stop elements 1025. The stop elements 1025 may, for example, prevent the drawer 1010 from accidentally being removed (e.g., sliding out inadvertently). The stop elements 1025 may, for example, engage a rim 1030 of the drawer.

The height of a stop element 1025 may be configured relative to a height of the lid 1015 and/or a flange (e.g., 'lip,' rim) of the drawer that engages the slides 1020. For example, the stop element 1025 may be configured such that the drawer 1010 and/or the lid 1015 may be 'bumped' over the stop element 1025, such as in a lid mode and/or in a support mode of the lid 1015 relative to the drawer 1010. For example, a height of the slides 1020 may be configured with a tolerance relative to the drawer and/or the lid such that the drawer may be 'bumped' over the stop element without binding in the slides. In some embodiments, the tolerance may, for example, be ⅛" greater than a height of the lid. In some embodiments, the tolerance may, for example, be ¼" greater than a height of the lid. In some embodiments, the tolerance may, by way of example and not limitation, be ⅜" greater than a height of the lid.

As an illustrative example, the slides may be 1.75 inches in height. Interior dimensions of the depths of an illustrative container may, for example, be 2.125, 3.875, 5.625 (e.g., 1.75-inch increments). Such an embodiment may, for example, advantageously provide a versatile system. Shallow depths may, for example, advantageously be used for small parts, materials, and/or some tools.

The lid 1015 may, for example, have a corrugation channel(s) (e.g., such as disclosed at least with reference to channels 525 in FIGS. 5-9). In the support mode, the corrugation channel(s) of the lid may register with the stop element(s) 1025 such that the lid does not engage the stop element(s) 1025.

In some embodiments, the first slide 1020A and/or the drawer 1010 may be configured such that the first slide 1020A also applies a downward force to the drawer 1010 (e.g., by constraining a rim of the drawer 1010 in the first slide 1020A).

FIG. 11 depicts an employed Multimodal-Angle-Configured Track System (MPTS) in an illustrative use-case scenario 1100. FIGS. 12-15 depict close-up views of the example MPTS embodiment disclosed in FIG. 11. The illustrative use case scenario 1100 includes a user 1105. The illustrative use-case scenario 1100 includes an exemplary container system.

The illustrative use-case scenario 1100 includes an exemplary scenario 1100A. The exemplary container system includes an exemplary track system 1115. The exemplary track system 1115 includes an exemplary tray 1120 (shown sectioned front to back and the right side removed in FIG. 12). The user 1105 is opening an exemplary container 1120 by exerting a force F.

The exemplary container 1120 includes an exemplary catch mechanism 1125. The exemplary container 110 includes an exemplary catch 1130. The exemplary container 1120 includes an exemplary track 1135. The exemplary track includes an angle configuration. The angle configuration may, for example, include a polyangular track 1505. As shown, the polyangular track 1505 may act as an angle engagement feature, engaging a slide 120 (e.g., functioning as an angle engagement slide as shown in FIG. 11-14). In the example shown in FIG. 15, the polyangular track 1505 is on a lower edge of a wall 1500 of the tray 1120 while the tray 1120 is configured as a lid, turned upside down, and disposed under a container 110. The exemplary container 1120 includes an exemplary opening catch mechanism 1145. The exemplary container system 1101 includes an exemplary opening catch 1140.

In some embodiments, the angles of the container may, for example, allow the container to tilt such that the container makes contact with the top and bottom rack rails over a given area (e.g., ½ inches, ¾ inches, 1 inch, etc.). The polyangular configuration on the container may, for example, minimize stress on the rack rail compared to a container angle configuration that was straight. The polyangular configuration may, for example, include a curvature configuration. Forces may, for example, be minimized particularly at the front most part of the rack rail where the container is exiting the rack. The polyangular configuration on the container may, for example, be used to replace a thicker plastic rail or a rail supported with stronger material for a straight rail configuration.

The angles on the container allow the container to "rock" up and down instead of laying flat. When "rocked" in the down position the container will extend from the rack in the same plane as the rack rails. Without the angles the container would progressively tilt downward as it is pulled out.

Figure 14:
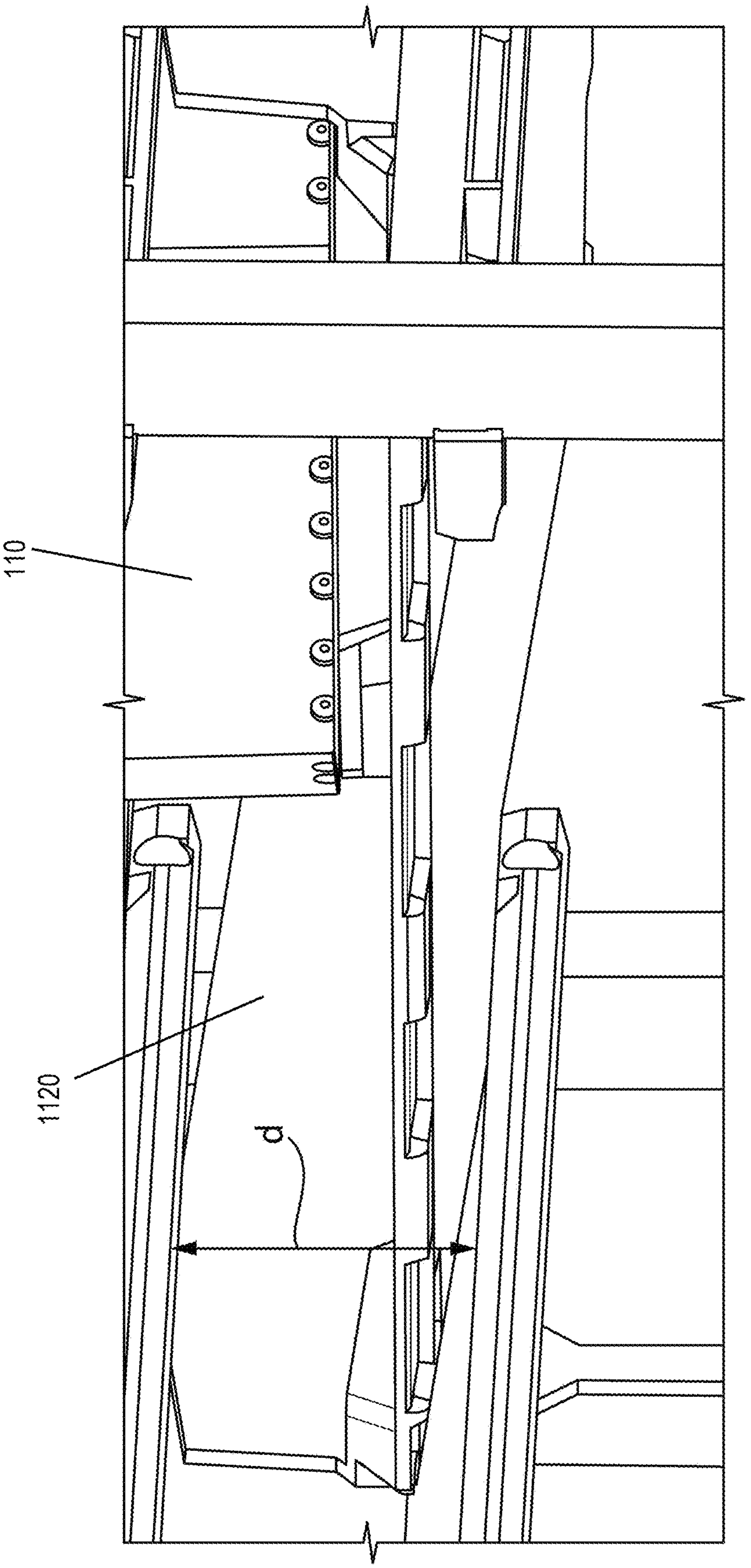
Figure 15:
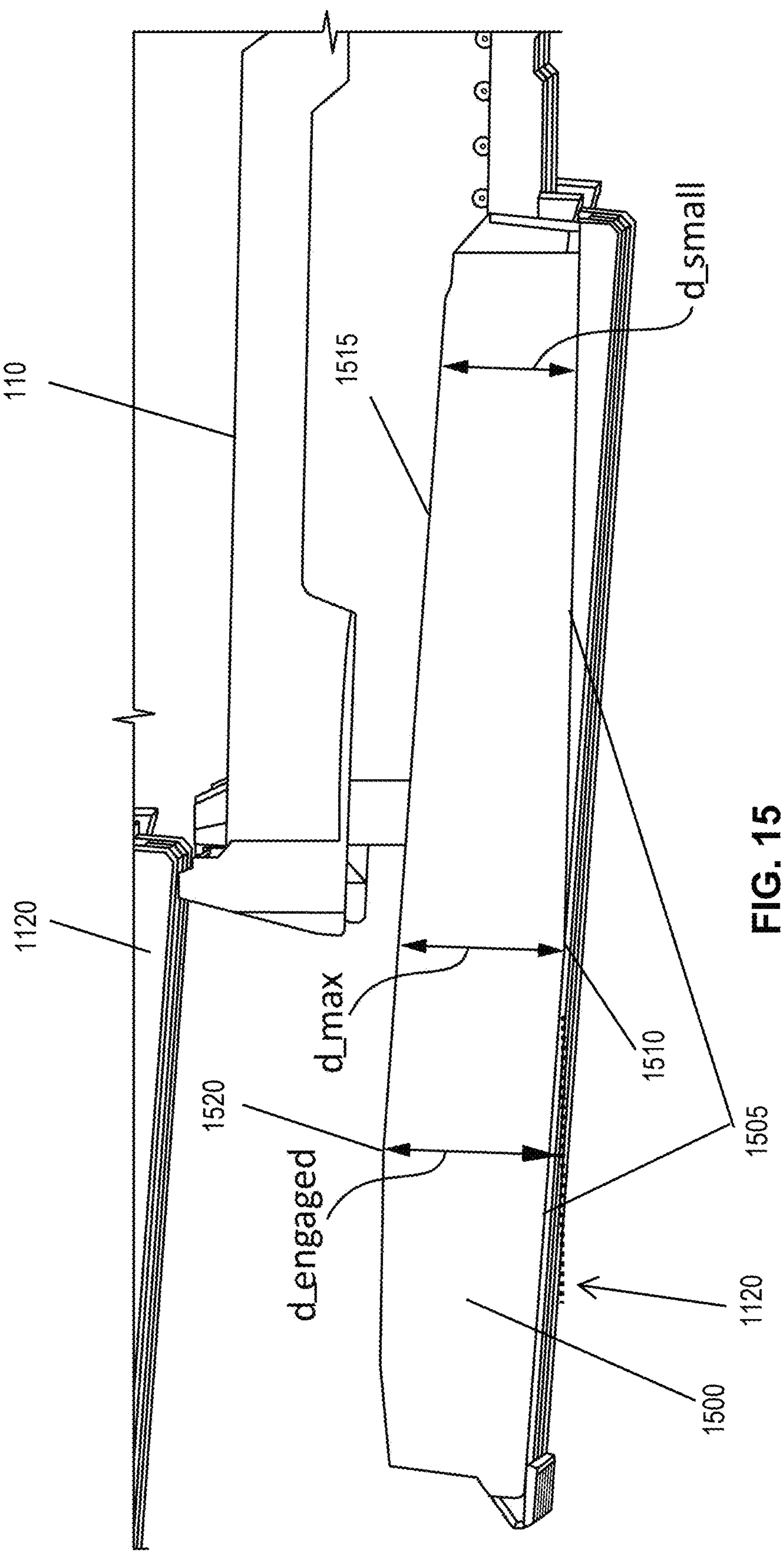

The angles on the container which allow the "rocking" of the container also allow the container to fit under the "tray catch" of the container when the container is "rocked" in the up position-so that the container is automatically retracted when closing the container. The container may, for example, include a drawer. The container may, for example, include a tray. For example, the tray 1120 may be configured as a lid, as shown in FIG. 11 and FIGS. 14-15. In the embodiment shown in FIG. 15, the tray 1120 supports a container 110, such as disclosed at least with reference to FIGS. 1, 3, and 10.

In some embodiments, the container's center of gravity may, for example, be biased to the "rocked" down position (upper arrow of motion M1 in FIG. 13) so that it automatically assumes this position. The container (tray 1120, such as operating as a lid as shown in FIGS. 14-15) may, for example, be lifted up (lower arrow of motion M1 in FIG. 13) to bypass the catch of the track system catch and remove the container from its position in the rack under the container 110.

The illustrative use-case scenario 1100 includes an exemplary scenario 1100B. The exemplary scenario 1100B includes an exemplary force diagram of activating opening the drawer. A first force F1 is applied downward such that the catch mechanism 1125 clears the catch 1130 with some clearance. The catch may, for example, include a flange. The required clearance may, for example, include ⅜". The clearance may, for example, include ½". The clearance may, for example, include ¼". The clearance may, for example, include a clearance that corresponds to a metric system. A second force may, for example, be then applied to pull the container from the assembly using the exemplary track.

The illustrative use-case scenario 1100 includes an exemplary scenario 1100C. The exemplary scenario 1100*c* includes an exemplary path beginning at a starting point 1150*a*. The exemplary path 1150*b* then begins from the exemplary staring point 1150*a*. The exemplary path 1150*b* ends at exemplary ending point 1150*c*. The exemplary path may, for example, correspond to the exemplary forces applied to the exemplary container in use-case scenario 1100B. The exemplary scenario 1100C includes an exemplary axis 1155 wherein the container slides along.

Some embodiments may, for example, include a mode configuration of a rock up mode and a rock down mode. The rock up mode may, for example, include a stowage mode for the drawer. The rock down mode may, for example, include an opening mode. The rock down mode may, for example, be used to close the drawer. The rock up mode may, for example, be used with the open drawer wherein the drawer has passed the catch.

The exemplary track may, for example, include a polyangular configuration to allow for a greater surface area of engagement such that forces are applied to a greater surface area due to the curvature of the track. The curvatures may, for example, include height parameters. The curvatures may, for example, include a continuous drawer extension such that the drawer when pulled out stays at the same height rather than the height of the drawer fluctuating with the curvature of the track.

The height parameter of the track, may, for example, vary based on its position on the rack such that the drawer's height remains within a predetermined range (e.g., at a particular height, and/or between a height range-such as from d_small to d_max as depicted in FIG. 15) as the drawer is pulled out. In some embodiments (e.g., as shown in FIG. 15), the height at the end of the track, the maximum height of the track, and the height at the other end of the track may, for example, be parameters to create the angle of the track.

As shown in FIG. 15, an upper edge of the wall 1500 has an apex 1520 between a front and rear end of the tray 1120. The upper edge in the depicted configuration is shown as an opposing edge to the edge of the wall (lower edge in the position shown) on which the polyangular track 1505 is located. As depicted (including d_engaged, d_max and d_small), the opposing upper edge and lower edge of the wall 1500 cooperate to define the height parameters as discussed above.

In some embodiments, an advantage to stacking the allows may include lower manufacturing costs. Further, dividers may, for example, be placed such that when a user tightens the drawer down the drawer will hold the dividers in. For example, the tightening process may, for example, allow for customization of dividers and provide sturdiness.

In some implementations, a first and second bottom piece may be coupled in the rim of the drawer such that the coupling is bolted together. A first bottom piece may, for example, include a scarf joint. The combination may be coupled such that the first and second bottom piece couple together and stack.

In some implementations, the drawers may be stacked. The drawers may be molded such that they can be stacked. Longer bolts may, for example, be included to provide different depths for the containers.

There may for example be different ways to manufacture the drawer. Another thing about the space between each container, that a user may, for example, may operate the lid vertically, with knowledge of the angles and the rocking, such that the lid can rise as receives a push. There may, for example, be multiple implementations that achieve this function.

In some implementations, the lid above the drawer utilizes that space for clearance. The greater clearance may, for example, allow the lid to touch the bottom drawer because they both rock in conjunction with each other.

In some implementations, a drawer may, for example, have small parts. The drawers may, for example, include dividers. This may, for example, allow for the lid to prevent the loss of very small screws. The drawer may, for example, provide full access and be cost effective by being manufactured out of plastic. The angles drawers may, for example, provide support to the rocking motion. The angle may, for example, distribute the weight on these rails. The angles may, for example, make the whole thing much more cost-effective. The angles may, for example, allow for the interchangeability of the drawers.

For example, the drawer may be mobile and still allow to contain small parts, such that it does not become loose as it is turned upside down and/or wedged into places. The drawer may, for example, not include a top such that the drawers are mobile and useful in mobile environments such as for construction.

Although various embodiments have been described with reference to the figures, other embodiments are possible. For example, although an exemplary system has been described with reference to the figures, other implementations may be deployed in other industrial, scientific, medical, commercial, and/or residential applications. For example, various embodiments may be configured for applications including construction, residential, janitorial, commercial, warehousing, retail, laboratory, clinical, crafting, or some combination thereof. In various embodiments, LSCSs (e.g., LSCS 100, LSCS 500, LSCS 1000) may be configured with housings (e.g., 105) adapted for fixed locations (including permanent installation), transport, installation in portable facilities (e.g., vehicles), carrying and/or otherwise moving by a human, or some combination thereof. In various embodiments housings (e.g., 105) may be provided, by way of example and not limitation, with doors, lids, hinges, wheels, handles (e.g., fixed and/or telescoping), mounting hardware, or some combination thereof.

For example, in some embodiments, a catch and/or engagement feature may, for example, be assembled to a drawer. For example, the drawer engagement feature 125 may, for example, be snap fitted and/or or attached by fasteners (e.g., screws) to the drawer 110. In some embodiments, by way of example and not limitation, a catch and/or engagement feature may, for example, be integrally formed with a drawer and/or lid (e.g., a corresponding slider may be provided in a core of a mold).

In various embodiments, a drawer may be provided with locking elements. For example, a locking element(s) may be mounted on a drawer and/or housing. The locking element (s) may be selectively operated (e.g., rotated) to releasably couple the drawer to the housing (e.g., to prevent the drawer from sliding out of the housing during transport). In some embodiments, a locking element may releasably couple a lid to a drawer (e.g., to prevent contents spilling during transports).

In various embodiments a container (e.g., drawers 110) with a lid (e.g., multi-mode lid 115) in a closure mode (e.g., 'lid mode') may be entirely removed from a housing (e.g., the housing 105) and transported to a different location. For example, the container and lid in a closure mode may be removed from a stationary housing (e.g., in a garage, workshop, storage facility, warehouse) and transported to another facility, a job site, a worktable, or other desired location. In various embodiments the container and lid may be relocated into another housing (e.g., a rolling housing, a totable housing, a housing disposed and/or installed in a vehicle). For example, the container and lid may be removed from a stationary housing in a facility and relocated into a portable housing for transport. Upon reaching a destination, the container and lid may be used within the housing, may be relocated into another housing (e.g., configured for use on a job site), may be removed entirely from a housing (e.g., for carrying with a user), or some combination thereof. Accordingly, various embodiments may advantageously provide a user a modular container storage and/or transportation system that is capable of efficiently storing, transporting, and/or using contents of a container.

In various embodiments a container/drawer may be modularly constructed (e.g., as depicted in FIGS. 3A-6N of U.S. Provisional Application Ser. No. 63/150,134, the entirety of which is incorporated herein by reference). Such embodiments may, for example, advantageously allow multiple drawers to be shipped without taking up a large volume of space which would be cost prohibitive to the buyer. In various embodiments an exemplary drawer assembly (e.g., as depicted in FIGS. 4A-4H of U.S. Provisional Application Ser. No. 63/150,134, the entirety of which is incorporated herein by reference) may be configured to reinforce the bottom of the drawer. The drawer may, for example, be configured to support a load 24 hours a day, seven days a week (e.g., substantially continuously). In various embodiments a drawer assembly (such as shown, for example, in FIGS. 4A-4H of U.S. Provisional Application Ser. No. 63/150,134) may advantageously provide a drawer with substantially no draft angles (e.g., straight vertical sides and/or ends) once assembled, which may advantageously maximize the interior space of the drawer. The drawer assembly may, for example, advantageously be formed (e.g., from plastic) using a mold without complex moving parts (e.g., without requiring mold core sliders, lifters, collapsible cores).

In an exemplary drawer construction, reinforcement rods may be inserted into a mold. Three sides of the mold may be molded (e.g., two sides and the bottom). The mold may, for example, have no draft angle. The three sides of the drawer may be able to be stripped from the mold because, without the two ends, air may readily be able to prevent a vacuum and/or the shrinkage of the material (e.g., plastic) may not pull the sides tight to the core since there are only two sides. The two sides may, for example, be (also) free to flex away from the mold core.

The three-sided drawer may, by way of example and not limitation, be placed in a "packaging fixture" such that the drawer can effectively be made to have tapered sides, allowing it to be nestable with itself. A long dimension of the drawer, for example, may accordingly take on a gentle curve, without inducing hard bends at the sides of the drawer. Accordingly, various embodiments may advantageously allow this curve to be distributed across an entire bottom of a drawer such that the drawer is able to recover from this bend without damage and/or permanent set. In various embodiments the reinforcement rods (or other suitable reinforcing element) may advantageously both support the bottom of the drawer and act as fastener points to bolt on one or more remaining sides of the drawer.

In various embodiments one or more channels of the housing may be reinforced. For example, metal (e.g., aluminum) channels may be inserted into the end of (plastic) channels formed in the housing. In some embodiments only about half or less than half (e.g., about ⅓) of the length of the channel may be reinforced. For example, only a portion of the channel in which the lid is engaged in a support mode when the drawer is extended may be provided with reinforcement. In various embodiments reinforcement of the channels may advantageously enable a housing (e.g., molded plastic with integrated channels) to support the cantilever load of the drawer (e.g., to achieve desired weight capacity and/or durability characteristics). Various embodiments with channel reinforcement may advantageously reduce cost and/or weight by providing reinforcement only in locations which experience mechanical loads over one or more predetermined thresholds. In various embodiments two (plastic) halves may be joined together by a frame.

In various embodiments housing(s) and/or drawer(s) may be configured to be injection molded, by way of example and not limitation, out of structural foam plastic. For example, various embodiments may advantageously be injected without foam and thicker sections cored out and ribbed. In various embodiments the housing(s) and/or drawer(s) may advantageously be compression molded. For example, in some embodiments the housing(s) and/or drawer(s) may be constructed of a material (e.g., composite) from which reinforcement inserts are omitted.

In some embodiments, a housing may be stackable. A housing assembly may, for example, be constructed using extruded channels (e.g., aluminum, steel, plastic/composite). Various embodiments may, for example, be constructed primarily or completely of non-plastic materials. In various embodiments, the housing may, by way of example and not limitation, be provided with stackable features (e.g., extrusions, channels) for engaging a second housing in a stacked configuration.

In some embodiments, a lid may, for example, be provided with a single engagement feature. A corresponding drawer may, for example, be provided with an engagement channel (e.g., defined by a first and second engagement feature).

In various embodiments containers (e.g., drawers 110) may be supported in a housing by a telescoping drawer slide (e.g., a bearing slide, a linear slide). The drawer slide may, for example, be removable such that the container may be easily removed from the housing. In various embodiments, such as is depicted in the figures, a telescoping drawer slide is advantageously provided by the cooperation of the container (e.g., the drawers 110), the housing (e.g., the slides 120), and the corresponding lid (e.g., the multi-mode lid 115). For example, the load of a drawer may not be (substantially) acting on a telescoping member during movement of the drawer due to user support. The telescoping member may support the drawer when movement is stopped. Accordingly, the telescoping member (e.g., multi-mode lid 115) may be advantageously removed from the drawer's housing (e.g., housing 105) and used as a lid for the drawer, allowing the drawer to be removed from the housing and carried vertically as a case. In various embodiments the housing (e.g., housing 105), drawer (e.g., drawers 110), lid (e.g., multi-mode lid 115), or some combination thereof, may be provided with one or more stop elements to prevent a drawer from being entirely removed from the housing unintentionally.

Various embodiments may advantageously provide containers (e.g., drawers 110) that fit interchangeably into a housing (e.g., housing 105) and function like drawers while in the housing and as individual cases when not in the housing. In various embodiments, this is may be accomplished by the container and the housing being constructed in such a manner that with the lid (e.g., 115) of the container removed and placed beneath the container in channels (e.g., 120) belonging to the housing, the container can be pulled out of the housing like a drawer, causing the lid to extend in a telescopic fashion and support the container in the fully extended position.

In various embodiments, using a lid as part of a drawer slide may advantageously utilize two traits, for example, of a container with dual container and drawer functions. First, for a container to be transportable in any orientation (e.g., tipped vertical and carried by a handle like a briefcase) it may need a lid, for example, to keep its contents secure. Second, for a container to work within a housing as a drawer it may need a lid removed, for example, to access an inside of the container. Accordingly, various embodiments may advantageously enable a lid to serve the dual purpose of securing a container's contents and acting as part of the drawer slide. Therefore, various embodiments may advantageously achieve manufacturing and/or cost efficiencies by minimizing material and/or manufacturing complexity required beyond what is needed for a standard container.

Various embodiments may advantageously reduce or eliminate problems associated with a full-extension drawer 'jerking' and/or increased difficulty in sliding as a drawer approaches a fully extended position. For example, various embodiments may advantageously implement a container supported within a housing (e.g., as discussed in relation to FIGS. 1-6) without being attached to the housing, and/or a container (e.g., drawers 110) sliding inside of a channel (e.g., slides 120) without close tolerances. Instead, as depicted, for example, in FIGS. 1-6, various embodiments may advantageously be configured such that a lid (e.g., multi-mode lid 115) rides inside the channels (e.g., slides 120) of the housing (e.g., housing 105) only supporting a relatively small load in the sliding direction, and without taking (substantial) downward load of the contents of the container while sliding. Such embodiments may reduce the static and sliding friction on the lid member and, therefore, may advantageously allow the drawer to open and close easily.

In various embodiments the downward force applied by the contents of the container is only applied to the lid when it has stopped moving and is no longer being held by the user (e.g., in the fully extended position). In various such embodiments, a flange of the drawer may be configured such that it does not encounter a cantilevered loading while being slid and supported by the user and/or lid. Accordingly, various such embodiments may advantageously eliminate the need for a tight fit in a drawer slide to keep the drawer parallel to the housing.

In various embodiments the channels (e.g., slides 120), containers (e.g., drawers 110), lids (e.g., multi-mode lid 115), or some combination thereof, may be provided with friction-reducing members. Friction-reducing members may include, by way of example and not limitation, lubricating mechanisms, linear and/or rolling bushings, bearings, or some combination thereof.

Various embodiments may advantageously enable users (e.g., contractors) to conveniently store, organize, and/or access a large variety of tools, hardware, and/or other contents. For example, the storage capacity required for today's tools may be ten or more times of that needed before the advent of power tools. A carpenter may, for example, carry three nail guns to a job site to install trim work to allow the carpenter to do better work more efficiently. The carpenter may need multiple different lengths of nails for each gun. Keeping these items organized "loose" in a large box may not be a good option, nor may be carrying two or three separate boxes. Accordingly, various embodiments may advantageously provide advantages of "stacking" (e.g., increase portability, efficient use of space) while also maximizing content accessibility associated with drawers (which may not be as portable when not removable).

Accordingly, various embodiments may advantageously provide a container system including containers that can be transported and accessed individually, while also being capable of storage and content access as a (vertically) organized plurality of containers to also provide the accessibility and space efficiency of drawers.

Various embodiments may advantageously be configured such that individual containers may be transferred from one housing to another. For example, in various embodiments a "storage rack" may be configured to hold containers sufficient to hold a user's entire desired storage inventory (e.g., tools, hardware, components, parts, craft supplies, sewing supplies, food items, goods for sale). The storage rack may be configured, for example, as a (substantially) stationary system. The storage rack may, for example, be configured to receive a plurality of drawers in one or more columns. The storage rack may, by way of example and not limitation, be purchased and/or installed as a pre-built unit, as an assembly of modular components and/or units, constructed on-site, or some combination thereof.

In various embodiments a "drawer rack" may be configured, for example, in an accessible, configurable, and/or transportable manner. The drawer rack may, for example, be configured as a stackable housing (e.g., as depicted in FIG. 7 of U.S. Provisional Application Ser. No. 63/150,134, the entirety of which is incorporated herein by reference) such that multiple housings may be stacked upon one another in a releasable manner that is yet sufficiently secure during an intended use (e.g., transport). In various embodiments a top container of a drawer rack may be configured in a non-sliding manner such that the top container, when releasably and removable disposed in the drawer rack, does not slide forward to allow access to the contents of the top container. For example, such embodiments may provide an open and/or openable top of the housing to provide access to the contents of the top container(s) when disposed therein. Accordingly, various such embodiments may advantageously allow larger and/or heavier objects to be disposed in the top container by not requiring support while sliding forward. Various such embodiments may advantageously reduce tipping of a portable housing unit by eliminating sliding of a top container. Various such embodiments may omit or provide receptacle channels for stowage of a lid of the top container(s) in an access mode (e.g., underneath and/or behind the top container(s) and/or otherwise disposed about the housing).

In various embodiments containers (e.g., drawers 110) and/or lids (e.g., multi-mode lid 115) may be configured to nest within one another. Such embodiments may, for example, advantageously allow economical shipping of many containers and/or lids. In various embodiments a container may be unitary construction or be assembled from multiple components. For example, some embodiments may advantageously include one or more sides (e.g., 1, 2, 3, or more) of a container (e.g., with or without draft angle), and one or more sides may be configured to assemble thereto (e.g., front and/or back ends, sides, bottom) to form a complete container (e.g., 115). Accordingly, various embodiments may advantageously provide cost-effective configurations for manufacturing and/or transport.

In various embodiments a housing (e.g., housing 105) may be unitary construction and/or assembled from various components. For example, in some embodiments the housing may be provided with a shipping mode in which the housing is disassembled and/or collapsed into a compact configuration. For example, the sides, top, bottom, and/or back may be configured in some embodiments as separate pieces which may be transported (e.g., shipped) in a disassembled and then assembled into a deployed mode.

In various embodiments the lid and/or container may be provided with one or more reinforcement members. For example, reinforcement members may be embedded within a flange (e.g., 120 and/or 130), within a lid (e.g., 115), within a container (e.g., 110), within a housing (e.g., 105), or some combination thereof. For example, various embodiments may have wire members (e.g., longitudinal members, lateral members, mesh), fiber-reinforced material, or some combination thereof. Accordingly, various embodiments may advantageously provide strength suitable for containers holding, by way of example and not limitation, tools, hardware, large items, dense items, or some combination thereof.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A storage container comprising:

a container comprising a catch mechanism located at a distal end of the container;

a lid configured to removably cover the container in a lid mode, the lid comprising:

an angle engagement feature extending along an edge of a wall and defining a curvilinear path comprising an apex between a front and a rear of the lid; and a first lid engagement feature;

a housing comprising:

an angle engagement slide configured to slidingly engage the angle engagement feature when the lid is being pulled out of the housing; and, a container slide configured to slidingly receive the edge, wherein:

at least the angle engagement feature and the catch mechanism are configured such that:

the lid is biased such that a distal end of the lid rocks up and the lid engages the catch mechanism, and when the lid is rocked down the lid disengages from the catch mechanism, the container further comprises: a second lid engagement feature, and the first lid engagement feature and the second lid engagement feature are configured such that, in a support mode, when the lid is supported in the angle engagement slide beneath the container and the container is slid out of the housing beyond a first distance, then the first lid engagement feature and the second lid engagement feature interact to extend the lid from the housing such that the lid supports at least a portion of a weight of the container.

2. The storage container of claim 1, wherein the first distance is predetermined such that, when the container is fully extended, a front edge of the lid supports the container closer to a front of the container than a center of gravity of the container when empty.

3. The storage container of claim 1, wherein the first lid engagement feature comprises a convex surface extending outwards from the container.

4. The storage container of claim 1, wherein the second lid engagement feature comprises a convex surface extending inwards from an edge of the lid.

5. The storage container of claim 1, wherein the container comprises a drawer.

6. The storage container of claim 1, wherein the container comprises a tray.

7. The storage container of claim 1, wherein the angle engagement feature comprises a curvature configuration.

8. The storage container of claim 1, wherein the angle engagement feature is configured such that it allows the container to tilt such that the container makes contact with the angle engagement slide over a predetermined length.

9. The storage container of claim 8, wherein the angle engagement feature and an opposing edge of the wall of the lid are configured such that the container, in a fully extended position supported by the lid, is at a same height as in a retracted position.

10. The storage container of claim 1, wherein the wall further comprises:

an opposing edge of the wall from the edge comprising the angle engagement feature, wherein the opposing edge forms an upper edge of the wall when the lid is disposed underneath the container, wherein the opposing edge of the wall is defined by a curvilinear path having an apex between the front and the rear of the lid.

11. The storage container of claim 1, wherein:

the housing comprises a plurality of slides comprising the angle engagement slide, the container slide, and a third slide, and the plurality of slides are substantially uniformly distributed along a height of the housing.

12. The storage container of claim 1, wherein at least one of the container slide and the angle engagement slide comprises a channel recessed into the housing.

13. The storage container of claim 1, wherein the lid is configured to be biased by a center of gravity of the lid proximal to the apex.

14. A storage container comprising:

a container comprising:

an angle engagement feature extending along an edge of a wall and defining a curvilinear path comprising an apex between a front and a rear of the container; and a catch mechanism located a distal end of the container; and, a housing comprising:

an angle engagement slide configured to slidingly engage the angle engagement feature of the wall when the container is being pulled out of the housing, wherein at least the angle engagement feature and the catch mechanism are configured such that:

the rear of the container rocks up and engages a catch of the housing in a stowage mode; and the rear of the container rocks down and disengages from the catch in an opening mode.

15. The storage container of claim 14, further comprising:

a lid comprising a first lid engagement feature and configured to removably cover the container in a lid mode; wherein:

the container further comprises:

a second lid engagement feature, and the housing comprises a lid slide configured to slidingly receive the lid, wherein the first lid engagement feature and the second lid engagement feature are configured such that, in a support mode, when the lid is disposed in the lid slide beneath the container and the container is slid out of the housing beyond a first distance, then the first lid engagement feature and the second lid engagement feature interact to extend the lid from the housing such that the lid supports at least a portion of a weight of the container.

16. The storage container of claim 14, wherein the container comprises a drawer.

17. The storage container of claim 14, wherein the container comprises a tray.

18. The storage container of claim 14, wherein the angle engagement feature comprises a curved shape.

19. The storage container of claim 14, wherein the angle engagement feature allows the container to tilt such that the container makes contact with the angle engagement slide over a predetermined length.

20. The storage container of claim 14, wherein the wall further comprises:

a proximal height at a proximal end of the wall located toward the front or of the container; and an engagement height at a distal end of the wall comprising the angle engagement feature, wherein the proximal height is greater than the engagement height.

21. The storage container of claim 14, wherein:

the housing comprises a plurality of slides comprising the angle engagement slide, a lid slide, and a third slide situated between the angle engagement slide and the lid slide, and the plurality of slides are substantially uniformly distributed along a height of the housing.

22. The storage container of claim 14, wherein the angle engagement slide comprises a channel recessed into the housing.

23. The storage container of claim 14, wherein the container comprises a lid comprising the angle engagement feature.

24. The storage container of claim 14, wherein the container is a lid of another container.

* * * * *